United States Patent
Verbil et al.

(10) Patent No.: US 9,137,380 B2
(45) Date of Patent: *Sep. 15, 2015

(54) CONVERGED VOICE SERVICES

(71) Applicant: Qwest Communications International Inc., Denver, CO (US)

(72) Inventors: John Verbil, Scottsdale, AZ (US); Richard Cerami, Denver, CO (US); Tammy S. Brown, Littleton, CO (US); Joel Frederick, Brighton, CO (US)

(73) Assignee: Qwest Communications International Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/324,741

(22) Filed: Jul. 7, 2014

(65) Prior Publication Data

US 2014/0321454 A1    Oct. 30, 2014

Related U.S. Application Data

(63) Continuation of application No. 13/271,915, filed on Oct. 12, 2011, now Pat. No. 8,811,381.

(60) Provisional application No. 61/392,730, filed on Oct. 13, 2010.

(51) Int. Cl.
*H04L 12/66* (2006.01)
*H04M 7/00* (2006.01)
(Continued)

(52) U.S. Cl.
CPC ......... *H04M 7/006* (2013.01); *H04L 29/06224* (2013.01); *H04L 65/105* (2013.01); *H04L 65/1063* (2013.01); *H04L 65/1096* (2013.01); *H04M 1/2535* (2013.01); *H04M 1/658* (2013.01)

(58) Field of Classification Search
CPC ..................................................... H04M 7/006
USPC ........................................................ 370/352
See application file for complete search history.

(56) References Cited

U.S. PATENT DOCUMENTS

| 8,811,381 | B2 | 8/2014 | Verbil et al. |
| 2006/0187850 | A1* | 8/2006 | Ward et al. ............... 370/252 |

(Continued)

OTHER PUBLICATIONS

U.S. Appl. No. 13/271,905, filed Oct. 12, 2011 by Richard Cerami et al., and entitled, "Converged Voice Mail Services."
(Continued)

*Primary Examiner* — Shaq Taha
(74) *Attorney, Agent, or Firm* — Swanson & Bratschun, L.L.C.

(57) ABSTRACT

Novel tools and techniques for providing a subscriber with converged voice services, in which calls to one of the subscriber's telephone numbers is routed to some or all of the subscriber's telephone numbers (e.g., sequentially or simultaneously, depending on system configuration and/or subscriber preference). Some implementations employ a VoIP switch to handle call distribution among the subscriber's various phone lines, even if some (or all) of the subscribers telephone lines are not VoIP lines. In such implementations, upon receiving an incoming call directed to one of the subscriber's lines, a service switching point will route the call to a VoIP switch. Instructed by an application server, the VoIP switch will set up call legs (e.g., via the PSTN) to one or more of the subscribers' telephone numbers. Optionally, when one of the call legs is answered, the application server will instruct the VoIP switch to disconnect the other call legs.

22 Claims, 9 Drawing Sheets

(51) Int. Cl.
*H04L 29/06* (2006.01)
*H04M 1/253* (2006.01)
*H04M 1/658* (2006.01)

(56) References Cited

U.S. PATENT DOCUMENTS

| | | | |
|---|---|---|---|
| 2007/0015535 A1* | 1/2007 | LaBauve et al. | 455/552.1 |
| 2008/0069310 A1* | 3/2008 | Berstis et al. | 379/67.1 |
| 2010/0098057 A1 | 4/2010 | Stewart | |
| 2010/0173620 A1 | 7/2010 | Hicks, III | |
| 2010/0226362 A1 | 9/2010 | Kim et al. | |
| 2012/0113978 A1 | 5/2012 | Cerami et al. | |
| 2012/0127986 A1 | 5/2012 | Verbil et al. | |

OTHER PUBLICATIONS

U.S. Appl. No. 13/271,915, filed Oct. 12, 2011 by John Verbil et al., and entitled, "Converged Voice Services."
U.S. Appl. No. 13/271,915; Notice of Allowance dated Apr. 11, 2014; 26 pages.
U.S. Appl. No. 13/271,915; Corrected Notice of Allowability dated Jul. 9, 2014; 12 pages.
U.S. Appl. No. 13/271,915; Issue Notification dated Jul. 30, 2014; 1 page.
U.S. Appl. No. 13/271,905; Non-final Rejection dated Mar. 26, 2015; 14 pages.
U.S. Appl. No. 13/271,905; Notice of Allowance dated Jul. 23, 2015; 14 pages.

\* cited by examiner

CONVERGED VOICE SERVICES

CROSS-REFERENCES TO RELATED APPLICATIONS

The present disclosure may be related to the following commonly assigned applications/patents:

This application is a continuation of U.S. patent application Ser. No. 13/271,915, filed Oct. 12, 2011 by Verbil et al. and titled, "Converged Voice Services", which claims the benefit, under 35 U.S.C. §119(e), from provisional U.S. Patent Application No. 61/392,730, filed Oct. 13, 2010 by Cerami et al. and titled "Converged Telephone Services", both of which are hereby incorporated by reference, as if set forth in full in this document, for all purposes.

This application is related to U.S. patent application Ser. No. 13/271,905, filed Oct. 12, 2011 by Cerami et al. and titled "Converged Voice Mail Services", which is hereby incorporated by reference, as if set forth in full in this document, for all purposes.

The respective disclosures of these applications/patents are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to telephony services, and more particularly, to providing converged telephony services to a plurality of subscriber telephone numbers.

BACKGROUND

Consumers often find that they have to give out multiple telephone numbers (landline, wireless, and/or voice over Internet protocol ("VoIP")) to their contacts to ensure that they can be reached. Giving out only one number that can be used to reach them anywhere is often preferable. There are services that provide one-number service triggered off of a VoIP number or a wireless number. Since landline telephone numbers are the "home" phone numbers for many subscribers, however, such subscribers like to use that number as a primary number to which other numbers should be converged for one-number service. Moreover, by converging landline voice service with other numbers (such as wireless and/or VoIP numbers), landline subscribers can apply many of their landline-based features (such as an anonymous call screening service) before those calls ring their non-landline phones.

Accordingly, there is a need for solutions that can converge multiple subscriber telephone numbers using the components of a landline telephony network.

BRIEF SUMMARY

Various embodiments provide enhanced services to telephone subscribers with multiple telephone lines, which can include one or more traditional telephone lines, wireless telephone lines, Internet protocol-based telephone lines, and/or the like. Merely by way of example, one set of embodiments can provide a subscriber with converged voice services, in which calls to one of the subscriber's telephone numbers is routed to some or all of the subscriber's telephone numbers (e.g., sequentially or simultaneously, depending on system configuration and/or subscriber preference). In a novel aspect, some embodiments employ a VoIP switch to handle call distribution among the subscriber's various phone lines, even if some (or all) of the subscribers telephone lines are not VoIP lines. In an exemplary embodiment, upon receiving an incoming call directed to one of the subscriber's lines, a service switching point will route the call to a VoIP switch. Instructed by an application server, the VoIP switch will set up call legs (e.g., via the PSTN) to one or more of the subscribers' telephone numbers. Optionally, when one of the call legs is answered, the application server will instruct the VoIP switch to disconnect the other call legs. Such embodiments employ a novel architecture that allows for flexible configuration and feature sets.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible and/or non-transitory computer readable media (such as, to name but a few examples, optical media, magnetic media, and/or the like).

An exemplary system for providing converged voice services might comprise an SSP, an application server (which could be implemented as an integrated system or a plurality of discrete functional components), and a VoIP switch. In an aspect of some embodiments, the SSP is configured to receive, via the PSTN, a call from a calling party to a first telephone number of a plurality of telephone numbers associated with a converged voice services subscriber, the plurality of telephone numbers further comprising a second telephone number. The SSP can be further configured to fire a TAT in response to receiving the call.

The application server might be configured to detect the TAT and determine, in response to the TAT, that the subscriber has configured simultaneous ring services. The application server might be further configured to send a message to the SSP instructing the SSP to forward the call to the VoIP switch. The VoIP switch, in an embodiment, is configured to receive the forwarded call from the SSP and send a first SIP INVITE, in response to receiving the forwarded call. The application server, then, might be further configured to receive the first SIP INVITE and send, in response to receiving the first SIP INVITE, a plurality of additional SIP INVITEs, the plurality of additional SIP INVITEs comprising an additional SIP INVITE corresponding to each of the plurality of telephone numbers and including a first additional SIP INVITE corresponding to the first telephone number and a second additional SIP INVITE corresponding to the second telephone number.

The VoIP switch, then, might be further configured to receive each of the plurality of additional SIP INVITEs and create a plurality of call legs via the PSTN. In an aspect, the plurality of call legs might comprise a call leg corresponding to each of the additional SIP INVITEs and including a first call leg to the first telephone number and a second call leg to the second telephone number. The VoIP switch might then connect the forwarded call with at least one of the call legs.

An exemplary method for providing sequential ring services might comprise receiving, at a service switching point (SSP), a first call from a calling party to a first telephone number of a plurality of telephone numbers associated with a converged voice services subscriber. In an aspect, the plurality of telephone numbers might further comprise a second telephone number; at least one of the plurality of telephone numbers might be a wireless number and at least one of the plurality of telephone numbers might be a wireline number. The method, in some cases, further comprises firing, at the SSP, a first termination attempt trigger (TAT) in response to receiving the first call and/or determining, in response to the first TAT, that the subscriber has configured sequential ring services. In some embodiments, the method further comprises instructing the SSP to forward the call to the wireless number.

In a particular embodiment, the method further comprises receiving, at a VoIP switch, a second call forwarded from a wireless system to a specified number associated with the VoIP switch. The VoIP switch might send a first SIP INVITE, in response to receiving the second call. The method, then, can comprise receiving the first SIP INVITE and sending a second SIP invite to the VoIP switch, in response to receiving the first SIP INVITE. In an aspect, the VoIP switch might route the second call, via the PSTN, to the landline number, in response to receiving the second SIP INVITE.

The method, then, might further comprise receiving the second call at the SSP, firing a second TAT in response to receiving the second call, and/or determining, in response to the second TAT, a context of the second call. In an aspect, the context might indicate that the second call is forwarded from a mobile switching center (MSC) associated with the wireless number. The method, in some cases, further comprises instructing the SSP to terminate the second call to the landline number, in response to determining the context of the second call.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
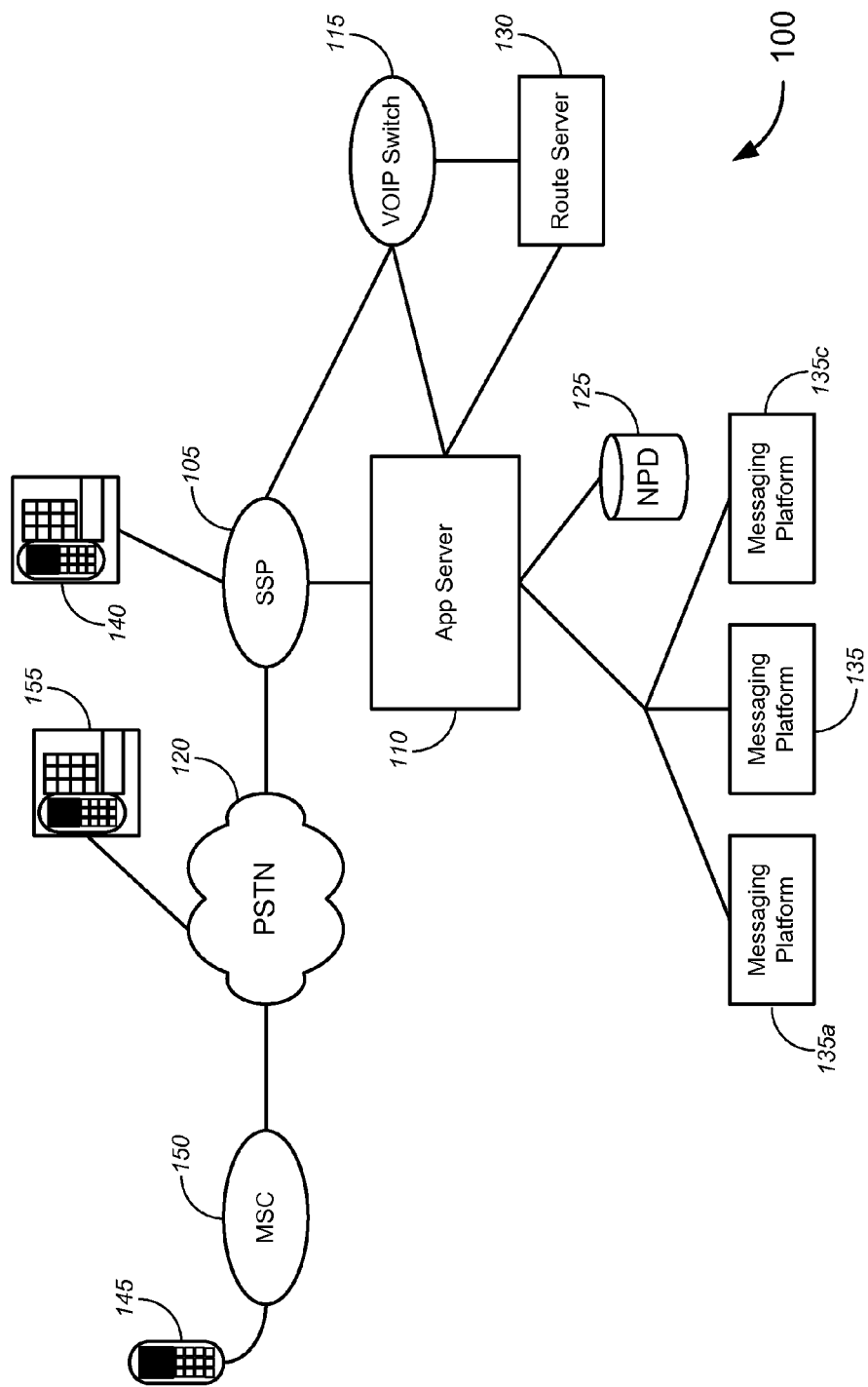
FIG. 1 is a block diagram illustrating a system for providing enhanced telephony services, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments provide enhanced services to telephone subscribers with multiple telephone lines, which can include one or more traditional "Plain Old Telephone System" ("POTS") lines, wireless (e.g., cellular) telephone lines, IP-based (e.g., voice over Internet Protocol ("VoIP")) telephone lines, and/or the like. (As used herein, the term "telephone line," when used in connection with a subscriber, indicates a telephone number ("TN") with which the subscriber can make and/or receive telephone calls, which generally are routed, at least in part, over the public switched telephone network ("PSTN"). It should be appreciated that, at any given time, some telephone lines are associated with a particular telephone (as in the case of a wireless line) or particular location that might have a plurality of telephone extensions (as in the case of a POTS line), while in other cases, a telephone line might be "virtual" and/or not be associated with any particular handset or other hardware (as in the case of many VoIP lines, on which calls can be placed or received with software-based "softphones" in a variety of locations). For purposes of this disclosure, then, a telephone line is considered to mean a telephone number associated with a subscriber (and, in the typical case, a telephone number at which the subscriber can receive calls via the PSTN).

In an aspect of certain embodiments, the tools and techniques described herein can be implemented without requiring substantial changes to VoIP and wireless networking technologies. Instead, such embodiments leverage the landline (POTS) infrastructure to provide additional enhanced functionality through the use of existing VoIP and wireless networking technologies. This feature can enable, for example, a subscriber to use a landline (POTS) number to provide one-number service (while still allowing calls to be directed to and/or answered by any other line that is part of the service, whether VoIP, wireless, or landline. Similarly, certain embodiments allow a subscriber's landline service to be the basis of a converged voice mail service without requiring substantial modifications to a wireless or VoIP network.

Merely by way of example, one set of embodiments can provide a subscriber with converged voice services, in which calls to one of the subscriber's telephone numbers is routed to some or all of the subscriber's telephone numbers (e.g., sequentially or simultaneously, depending on system configuration and/or subscriber preference). In a novel aspect, some embodiments employ a VoIP switch to handle call distribution among the subscriber's various phone lines, even if some (or all) of the subscribers telephone lines are not VoIP lines. In an exemplary embodiment, upon receiving an incoming call directed to one of the subscriber's lines, a service switching point will route the call to a VoIP switch. Instructed by an application server, the VoIP switch will set up call legs (e.g., via the PSTN) to one or more of the subscribers' telephone numbers. Optionally, when one of the call legs is answered, the application server will instruct the VoIP switch to disconnect the other call legs. Such embodiments employ a novel architecture that allows for flexible configuration and feature sets.

As another example, a set of embodiments can provide a subscriber with a unified voice mailbox for a plurality of the subscriber's telephone lines. In accordance with such embodiments, the subscriber does not need to check multiple voice mailboxes (each associated with one of the subscriber's telephone numbers) in order to ensure that the subscriber has received all messages intended for that subscriber. Instead, any incoming call on any of the subscriber's lines will be routed to a converged voice mailbox for easy retrieval by the subscriber of all messages from one location. Some such embodiments employ a VoIP switch to handle routing of the incoming call (and/or the subscriber's request to retrieve the resulting voicemail) to the correct voice mailbox.

I. Exemplary Architecture

FIG. 1 illustrates a system 100 that can be used to provide the enhanced services described herein. One skilled in the art will appreciate, of course, that the architecture of FIG. 1 is exemplary in nature and is not intended to limit the scope of various embodiments. For example, the description of the system 100 below mentions a few possible substitutes for various system components, and one skilled in the art will understand, given the description herein, that other substitutions are possible as well.

As illustrated, the system 100 comprises a telephony switch 105, which in various embodiments can be one of a variety of standard telephony switches, including, merely by way of example, a service switching point ("SSP") in an advanced intelligent network ("AIN"), a mobile switching center ("MSC") in a wireless intelligent network ("WIN"), and/or the like. (For ease of convenience, the telephony switch 105 will be referred to herein as an SSP, but it should be appreciated that other types of telephony switches, in particular Class 5 end office switches provisioned with AIN triggers, can be substituted in accordance with various embodiments.) The SSP 105 is in communication with an application server 110, which performs a variety of functions in accordance with various embodiments. (It should be noted as well, and is described in further detail below, that the functionality of the application server 110 can be distributed among a number of component devices and/or functions.) The functionality of the application server 110 is described in further detail below, but as a general matter, the application server acts as the data interface between the SSP 105 and the VoIP switch 115.

The VoIP switch 115 typically will have a data connection with the application server 110 and a voice connection (e.g., via a trunk line, ISDN primary rate interface ("PRI"), etc.) with the SSP 105. The VoIP switch 115, as a general matter, acts (upon instruction from the application server 110) to receive an incoming call and create one or more call legs to provide the enhanced services (e.g., one number service, converged voice mail service) described herein.

Thus, in accordance with some embodiments, when a call is received from the PSTN 120, the SSP 105 fires an termination attempt trigger ("TAT"), which is detected by the application server 110. If the subscriber to whom the call is directed is a subscriber to one or more of the enhanced services described herein (and the context indicates that such enhanced services should be implemented with respect to the incoming call), the application server 110 will direct the SSP 105 to route the call to the VoIP switch 115. The application server 110, as described in further detail below, will instruct the VoIP switch 115 to create call legs for routing the incoming call to the appropriate destination(s) in accordance with various embodiments.

In some embodiments, the system 100 can feature additional functions as well. Merely by way of example, in some embodiments, the system 100 includes a subscriber database 125, referred to herein as a "network profile database" (or "NPD"), in communication with the application server 110. The NPD 125 can store provisioning and/or configuration data, such as records of subscribers, including, in some embodiments, records that identify whether a particular subscriber has subscribed to the enhanced services provided by various embodiments and/or identify configuration parameters set by the subscriber or the provider with respect to the provision of those services. Merely by way of example, the record for a particular subscriber might indicate that the subscriber has subscribed to a one-number service and has configured the service with a sequential ring configuration; the record might further indicate that the subscriber has configured the subscriber's wireless number as the first destination for incoming calls, followed by a first landline number, followed by a second landline number, followed by voice mail. The application server 110, then, can query the NPD 125 to determine the proper action to take with regard to an incoming call to one of the subscriber's numbers. In some embodiments, the NPD 125 is implemented as a home subscriber server ("HSS") known in the art.

In other embodiments, the system 100 might include a route server 130 in communication with the application server 110 and/or the VoIP switch 115 (e.g., via standard IP communications). The route server 130 can be queried by the application server 110 and/or the VoIP switch 115 to determine routing for messages (e.g., SIP INVITE messages, as described further below) and/or call legs in furtherance of the enhanced services described herein.

In yet further embodiments, the system 100 might comprise one or more messaging platforms 135. (While the illustrated system 100 includes three messaging platforms 135a, 135b, 135c, it should be appreciated that other embodiments might include no messaging platforms, one messaging platform, or any number of messaging platforms). In an embodiment, the messaging platforms 135 are implemented as server computers running appropriate software to serve as voice mailboxes for a plurality of users. In an aspect, this software is capable of communicating (e.g., with the application server 110 and/or the VoIP switch 115) using SIP communications (e.g., SIP INVITE messages and appropriate responses).

Thus, the system 100 can be used to receive a call from a calling telephone 155 (e.g., at the SSP 105 via the PSTN 120). Such a call might be directed to a subscriber telephone 140 associated with the subscriber's wireline (POTS) number or VoIP number, a subscriber telephone 145 associated with the subscriber's wireless number (and in connectivity with the PSTN 102, the SSP 105, and/or the VoIP switch 115 via a wireless network that includes standard WIN components, including for example an MSC 150). When the incoming call is received at the SSP 105 (either directly from the calling party's local office via the PSTN or forwarded from the MSC 150 if directed to the wireless number), it can be processed as described in further detail below.

A number of variations are possible. For example, if the system is implemented in a wireless network (e.g., a WIN network), the MSC and/or home location register ("HLR," which can serve as an NPD as well) might be in communication with the application server 110. Additionally and/or alternatively, while FIG. 1 illustrates the VoIP switch 115 as being in direct communication—e.g., via a PRI—with the SSP 105 that serves the subscriber telephone 140, this need not necessarily be the case. In some cases, for example, a single VoIP switch 115 might provide enhanced services for a number of subscribers served by different SSPs 105, and the VoIP switch 115 need not have a PRI connection—or any other direct other connection—with all of those SSPs. 105)

Figure 2:
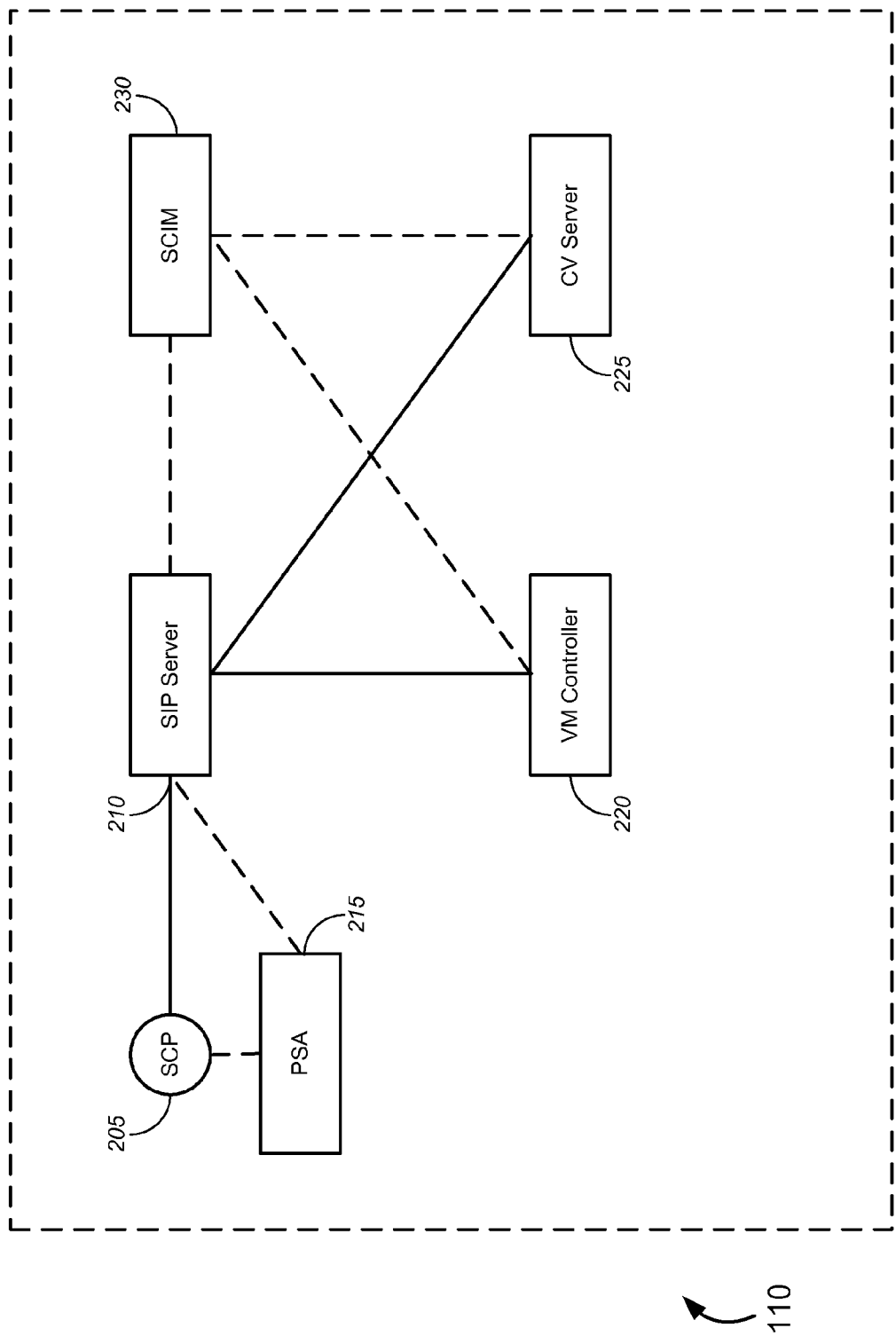
FIG. 2 is a block diagram illustrating the functional components of an application server, in accordance with various embodiments.

While the application server 110 is illustrated generally in FIG. 1, one skilled in the art will appreciate, based on the disclosure herein, that the application server 110 can perform a variety of functions in accordance with various embodiments. Within the scope of these embodiments, the functions of the application server 110 can be relatively integrated or relatively separated, into separate functional components. Thus, when this document attributes functionality to the application server, the reader should understand that such functionality can be implemented by one or more of the application server's appropriate functional components. FIG. 2 illustrates the application server 110 divided into such functional components, which can be implemented as separate processes (e.g., servers, servlets, etc.) within the same hardware platform or as two or more separate hardware components that each perform one or more functions of the application server 110.

As illustrated by FIG. 2, one functional component of the application server can be a service control point ("SCP") 205 in an AIN network (which, again, can be implemented as a separate device that communicates with the application server 110 and/or various other components of the application server 110 and/or the system 100 generally). As a general matter, the SCP function 205 can detect AIN triggers fired by the SSP 105 and can invoke other system components based on the detection of those triggers and/or the results of processing performed by the SCP function 205.

Merely by way of example, the SCP function 205 can invoke a SIP server function 210 in response to identifying a call that is directed to a subscriber of the enhanced services described herein. In some cases, the SCP function 205 can invoke the SIP server function 210 directly (e.g., with a SIP message that the SIP server can interpret, such as a SIP INVITE). In other cases, the SCP function 205 might only be able to communicate using a Parlay interface known in the art. In this case, a Parlay-SIP adapter function 215 might be provided to translate (as described in further detail below) between Parlay messages and messages that the SIP server can interpret, such as SIP INVITEs.

In some cases, the application server 110 will include a voice mail ("VM") controller function 220, which can be implemented as a standalone server, as a servlet on another device (such as the SIP server 210 and/or application server 110), etc. The VM controller 220, in an aspect, contains the core logic to control how calls are routed to voice mail for subscribers of the converged voice mail service. Similarly, in other cases, the application server 110 will include a converged voice ("CV") server function 225, which also can be implemented as a standalone server, as a servlet on another device (such as the SIP server 210 and/or application server 110), etc. The CV server contains the core logic to control how calls are routed for subscribers to the converged voice (one-number) service described herein.

In some cases, the SIP server function 210 can communicate directly with the VM controller function 220 and/or the CV server function 225. In other embodiments, the application server 110 might include an intermediary device, such as a service capability interaction manager ("SCIM") 230 (which is a standard component of the IP Multimedia System ("IMS") architecture) that has been modified to operate in accordance with the functionality described herein. The SCIM 230 can act as a service broker that provides feature interaction management (if needed) between the SIP server 210 and the VM controller 220 and/or CV server 225.

It bears mention, once again, that the various functional components illustrated by FIG. 2 can be implemented as separate hardware components or software functions, and/or one or more of the functional components can be omitted as appropriate. For example, if the SCP function 205 and SIP server function 210 are integrated or can communicate directly, the PSA function 215 might be omitted. As another example, if SIP server 210 includes and/or can communicate directly with the VM controller function 220 and/or CV server function 225, the SCIM 230 might be omitted.

Figure 3:
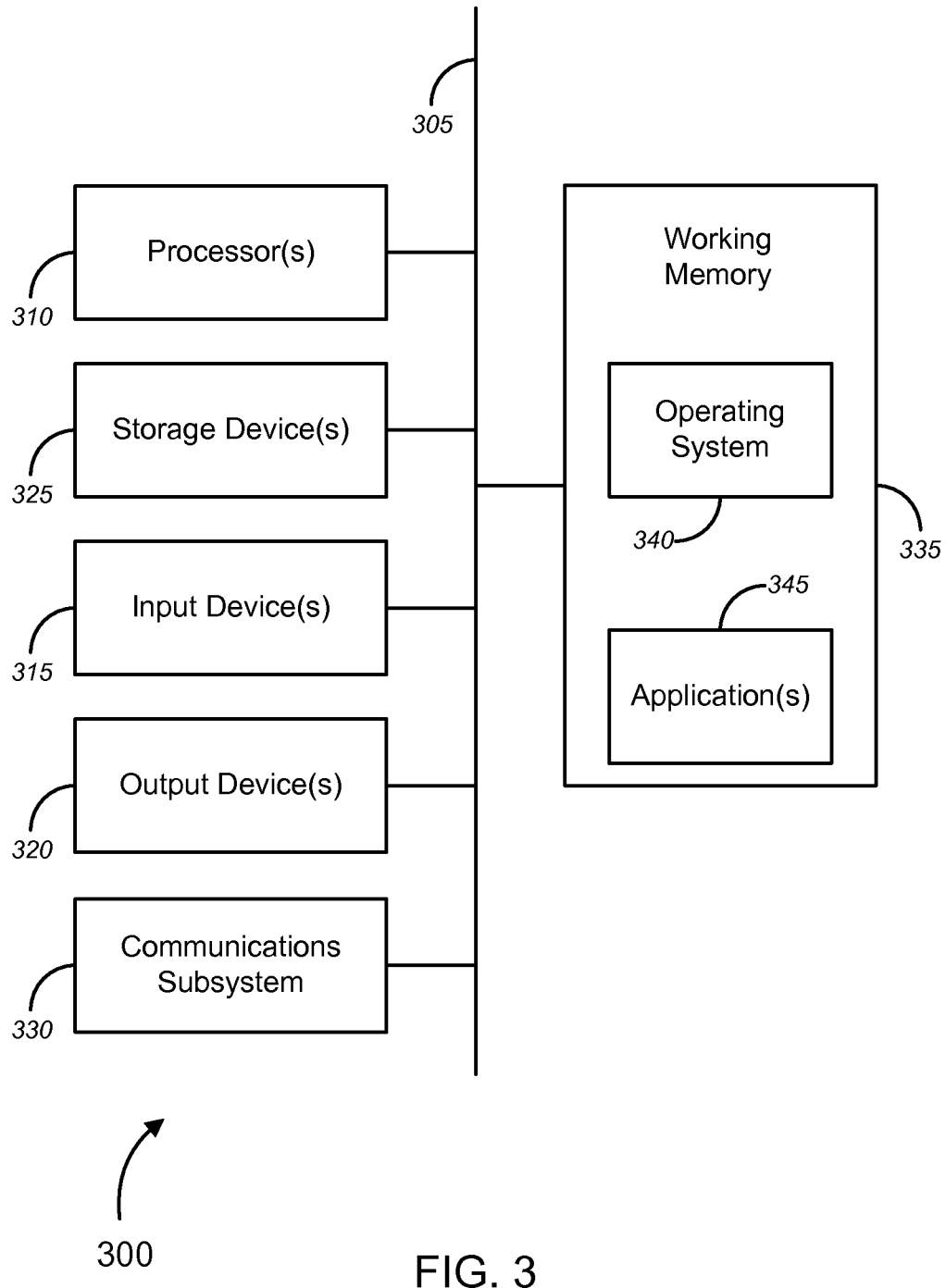
FIG. 3 is a generalized schematic diagram illustrating a computer system, in accordance with various embodiments.

FIG. 3 provides a schematic illustration of one embodiment of a computer system 300 that can perform the methods provided by various other embodiments, as described herein, and/or can function as a wireless telephone, VoIP switch, telephony switch, server (e.g., application server, SIP server) and/or any other component of the system 100 and/or the application server 110 described above. It should be noted that FIG. 3 is meant only to provide a generalized illustration of various components, of which one or more (or none) of each may be utilized as appropriate. FIG. 3, therefore, broadly illustrates how individual system elements may be implemented in a relatively separated or relatively more integrated manner.

The computer system 300 is shown comprising hardware elements that can be electrically coupled via a bus 305 (or may otherwise be in communication, as appropriate). The hardware elements may include one or more processors 310, including without limitation one or more general-purpose processors and/or one or more special-purpose processors (such as digital signal processing chips, graphics acceleration processors, and/or the like); one or more input devices 315, which can include without limitation a mouse, a keyboard and/or the like; and one or more output devices 320, which can include without limitation a display device, a printer and/or the like.

The computer system 300 may further include (and/or be in communication with) one or more storage devices 325, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 300 might also include a communications subsystem 330, which can include without limitation, switch fabric and/or ports, modems, ISDN cards, network cards (wireless or wired), wireless radios and/or chipsets (such as a Bluetooth™ device, an 802.11 device, a WiFi device, a WiMax device, a WWAN device, cellular communication facilities, etc.), and/or the like. The communications subsystem 330 may permit data to be exchanged with a network, with other computer systems, and/or with any other devices described herein. In many embodiments, the computer system 300 will further comprise a working memory 335, which can include a RAM or ROM device, as described above.

The computer system 300 also may comprise software elements, shown as being currently located within the working memory 335, including an operating system 340, device drivers, executable libraries, and/or other code, such as one or more application programs 345 (including without limitation server or servlet programs), which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 325 described above. In some cases, the storage medium might be incorporated within a computer system, such as the system 300. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer system 300 and/or might take the form of source and/or installable code, which, upon compilation and/or installation on the computer system 300 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 300) to perform methods in accordance with various embodiments of the invention. According to a set of embodiments, some or all of the procedures of such methods are performed by the computer system 300 in response to processor 310 executing one or more sequences of one or more instructions (which might be incorporated into the operating system 340 and/or other code, such as an application program 345) contained in the working memory 335. Such instructions may be read into the working memory 335 from another computer readable medium, such as one or more of the storage device(s) 325. Merely by way of example, execution of the sequences of instructions contained in the working memory 335 might cause the processor(s) 310 to perform one or more procedures of the methods described herein.

The terms "machine readable medium" and "computer readable medium," as used herein, refer to any medium that participates in providing data that causes a machine to operation in a specific fashion. In an embodiment implemented using the computer system 300, various computer readable media might be involved in providing instructions/code to processor(s) 310 for execution and/or might be used to store and/or carry such instructions/code (e.g., as signals). In many implementations, a computer readable medium is a non-transitory, physical and/or tangible storage medium. Such a medium may take many forms, including but not limited to, non-volatile media, volatile media, and transmission media. Non-volatile media includes, for example, optical and/or magnetic disks, such as the storage device(s) 325. Volatile media includes, without limitation, dynamic memory, such as the working memory 335. Transmission media includes, without limitation, coaxial cables, copper wire and fiber optics, including the wires that comprise the bus 305, as well as the various components of the communication subsystem 330 (and/or the media by which the communications subsystem 330 provides communication with other devices). Hence, transmission media can also take the form of waves (including without limitation radio, acoustic and/or light waves, such as those generated during radio-wave and infrared data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 310 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 300. These signals, which might be in the form of electromagnetic signals, acoustic signals, optical signals and/or the like, are all examples of carrier waves on which instructions can be encoded, in accordance with various embodiments of the invention.

The communications subsystem 330 (and/or components thereof) generally will receive the signals, and the bus 305 then might carry the signals (and/or the data, instructions, etc. carried by the signals) to the working memory 335, from which the processor(s) 305 retrieves and executes the instructions. The instructions received by the working memory 335 may optionally be stored on a storage device 325 either before or after execution by the processor(s) 310.

II. Functional Implementations

The architecture described above can be used to provide several enhanced telephony services, including, for example converged voice services (e.g., one-number service) and converged voice mail services. FIGS. 4-10 illustrate various methods that can be used to provide such enhanced services. While the methods of FIGS. 4-10 are illustrated, for ease of description, as different methods, it should be appreciated that the various techniques and procedures of these methods can be combined in any suitable fashion, and that, in some embodiments, the methods depicted by FIGS. 4-10 can be considered interoperable and/or as portions of a single method.

Similarly, while the techniques and procedures are depicted and/or described in a certain order for purposes of illustration, it should be appreciated that certain procedures may be reordered and/or omitted within the scope of various embodiments. Moreover, while the methods illustrated by FIGS. 4-10 can be implemented by (and, in some cases, are described below with respect to) the system 100 of FIG. 1 (or components thereof), these methods may also be implemented using any suitable hardware implementation. Similarly, while the system 100 of FIG. 1 (and/or components thereof) can operate according to the methods illustrated by FIGS. 4-10 (e.g., by executing instructions embodied on a computer readable medium), the system 100 can also operate according to other modes of operation and/or perform other suitable procedures.

A. Converged Voice Services

One service that can be provided by the novel architecture of certain embodiments is a converged voice service. A particular implementation of the converged voice service can provide simultaneous ringing and/or sequential ringing across some or all of the subscriber's telephone numbers when any of those numbers are called. (Such services are sometimes referred to as one number services.) One embodiment uses a single landline telephone number to ring multiple telephone numbers sequentially and/or simultaneously. In an aspect, the subscriber has a landline telephone number through which the calls to other numbers are triggered. Although one implementation of this service is to ring wireless numbers in addition to the landline number, there is no restriction on the type of other numbers that may be rung, including VoIP lines without a telephone number at all. Advantageously, according to certain embodiments, calls placed to the landline encounter AIN-based landline features first, so subscribers can forward or screen all of their calls through their AIN feature set before ringing other phones. Calls can be rung sequentially, simultaneously, or any combination of both sequential and simultaneous ringing among the multiple associated numbers. Calls can be routed to voice mail after a certain number of call attempts or a certain amount of time waiting for answer.

Although many service providers have products that ring multiple numbers sequentially or simultaneously by dialing a single number, certain embodiments employ novel features to provide this service. Merely by way of example, some embodiments employ use a landline telephone number as the "master" number through which the service is triggered and controlled. Other embodiments provide a novel technique for integrating two disparate networks (PSTN and VoIP) using a combination of AIN, Parlay, and/or SIP messaging.

As noted above, various embodiments can provide such a service through the architecture described above. For example, a specific implementation might include a PSTN Class 5 EOS provisioned with AIN Termination Attempt Trigger (TAT) and Call Forward Busy Line to a Voice Mail platform. This implementation might further comprise an SCP to receive the TAT. In one aspect, the SCP (which can be separate from or incorporated within an application server) might be provisioned with a signaling service that provides an abstraction of the OSA Parlay interface for third party call control, and manages feature interactions between the enhanced services and any other AIN features that may be provisioned on the landline.

In the described implementation, such a signaling service can employ a data interface (for example, the SR3389™ Generic Data Interface available from Telcordia™) to communicate with a services platform using abstracted open services architecture ("OSA") Parlay messages. The services platform (which can be implemented with, for example, Telcordia's Open Services Platform™) can be used, if necessary, to provide protocol conversion between the Parlay abstraction used by the SCP and a standard OSA Parlay CORBA interface to a Parlay-Enterprise Java Beans adapter, which can convert the Parlay message to an Enterprise Java Beans ("EJB") message. A Parlay/SIP Adapter (PSA) can provide protocol conversion between EJB and SIP. In other cases, such adapters might not be required if, for example the SCP function can communicate natively with a SIP server without requiring such intermediaries.

In this implementation, a SCIM performs feature interaction management of converged features such as the converged voice service. In other cases, the SIP server might be able to interact with the VM controller directly, and the SCIM can be omitted. The CV server, as noted above, can contain the core logic to control how calls are routed for CONS subscribers. An NPD can be used to store provisioning and configuration data, and a VoIP "softswitch" platform supports call routing and protocol conversion between ISUP and SIP. Some implementations might also include a media server ("MS"), which can also be implemented by a number of commercially-available applications and can provide audible announcement and DTMF collection capabilities under control of the CV server.

In the described implementation, the SCP is provisioned to supply an AIN Termination Attempt Trigger, on the SCP to identify the landline as a subscriber to OSA Parlay-based services, and on NPD to define the subscriber's CONS settings. Provisioning is also required on any associated telephone numbers to direct busy and unanswered calls back to either a toll-free number (for wireless endpoints) or virtual TNs (for VoIP endpoints), both of which route to the VoIP switch. In an alternative implementation, wireless endpoints can use WIN triggers to capture the busy, out-of-coverage, or no-answer condition, invoke the CV server via the SCP, and cause the call leg to be torn down (instead of using the wireless switch-based busy/no answer events).

Figure 4:
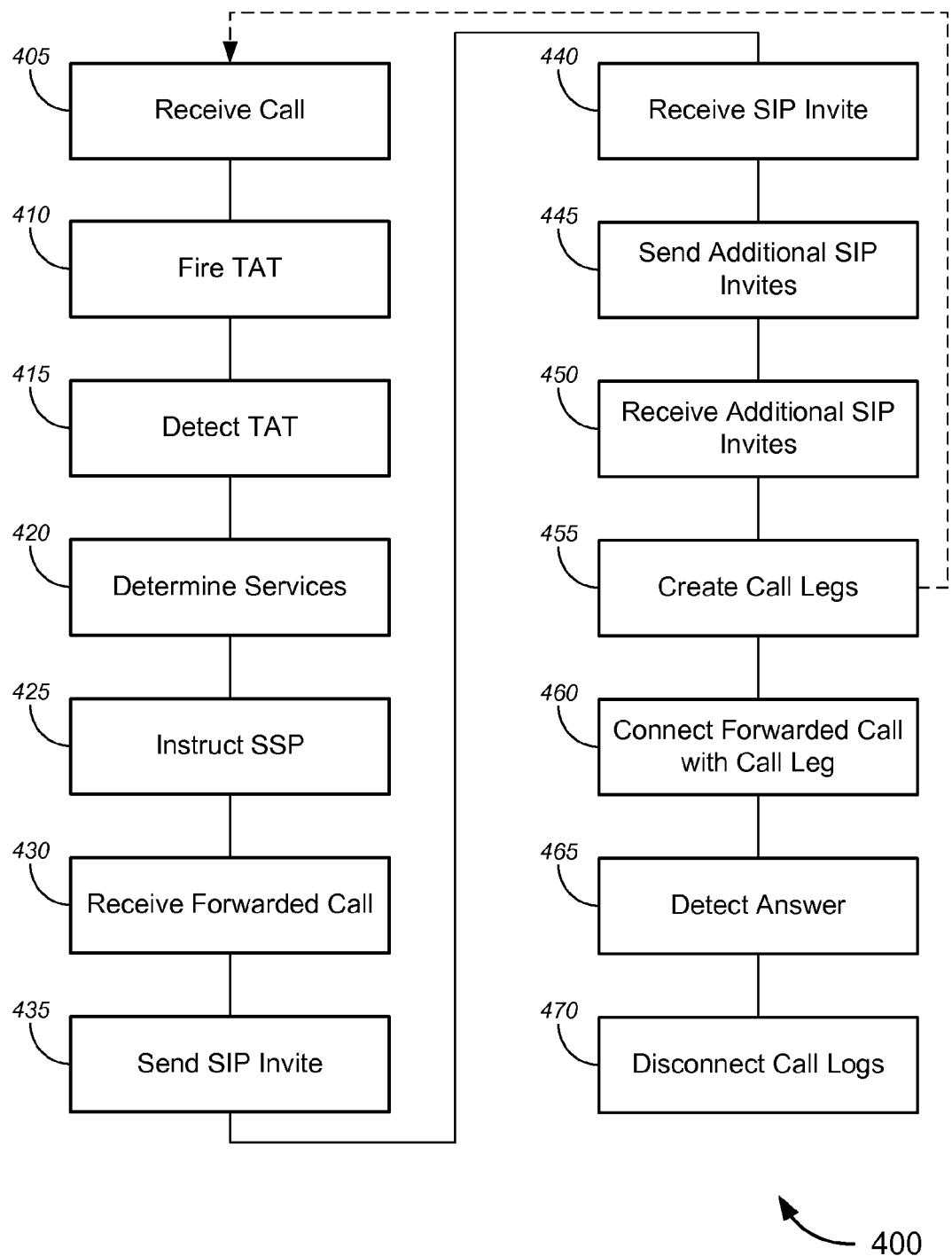
FIGS. 4-8 are process flow diagrams illustrating various methods for providing converged voice services, in accordance with various embodiments.

FIG. 4 illustrates a generalized method 400 of providing simultaneous ring services in accordance with one set of embodiments. The method comprises receiving (e.g., at an SSP) a call from a calling party to a telephone number of a subscriber of converged voice services. This subscriber telephone number might be one of a plurality of telephone numbers associated with that subscriber. At block 410, the SSP fires a TAT trigger, and at block 415, the TAT trigger is detected and/or received (e.g., by an SCP function, which might be provided by an application server in some embodiments). In response to detecting/receiving the TAT, the SCP function determines, at block 415 that the subscriber has configured simultaneous ring services (e.g., by querying the NPD for the subscriber's provisioning information). Based upon this determination, the SCP function instructs the SSP to forward the call to the VoIP switch (block 425).

The VoIP switch, upon receiving the forwarded call (block 430) generates a first SIP INVITE and sends the SIP invite to the application server (and/or a SIP server or CV server functional component thereof) (block 435). The application server (and/or a functional component thereof) receives the first SIP INVITE (block 445) and sends, to the VoIP switch, an additional SIP INVITE corresponding to each of the numbers in the subscriber's simultaneous ring group (the plurality of telephone numbers described above). In a particular case, this will include specifically a SIP INVITE corresponding to the subscriber number to which the original call was directed. The VoIP switch receives the additional SIP INVITES (block 445), and, in response, creates a call leg to each of the numbers corresponding to the additional SIP INVITES (block 455). These call legs might be placed via the PSTN, in accordance with one set of embodiments.

It is worth interjecting, at this point, that the set of call legs created by the VoIP switch, in many cases, will include a call leg to the landline number of the subscriber, which will be received by the SSP (indicated by the broken arrow between blocks 455 and 405). In that particular case, however, after the SSP fires the TAT and the SCP detects the TAT (blocks 410 and 415, respectively), the SCP will determine a context of that call leg (i.e., that it is a call created by the VoIP switch) and will instruct the SSP to terminate the call to the subscriber's landline, preventing an infinite call loop between the SSP and the VoIP switch.

Returning to FIG. 4, the VoIP switch then connects the call forwarded from the SSP with each of these call legs (block 460), thus causing each of the subscriber's numbers to ring substantially simultaneously. When the application server (or a functional component thereof) detects that one of the call legs has been answered (block 465), for example, by receiving a notification from the VoIP switch, the application server instructs the VoIP server to disconnect the unanswered call legs (block 470). Upon disconnection of the unanswered call legs, the call between the originating caller and the number answered by the subscriber can continue in conventional fashion.

In a novel feature of some embodiments, the application server is configured to perform operations to ensure that the answered call leg is in fact answered by the subscriber (or another human), rather than by an answering machine, voice mail, and/or the like, and to wait to instruct the VoIP switch to disconnect the unanswered legs until the application server has determined that one of the call legs has been answered by a human. Merely by way of example, in some cases, the system (or a component thereof, such as a media server) might play a predetermined tone (such as a particular DTMF tone) to cause a voice mail system to disconnect. In other cases, the system might play a message requesting the listener to press a particular key on a telephone handset and wait to instruct the VoIP switch to disconnect the call until receiving a DTMF tone corresponding to the particular key.

Figure 5:
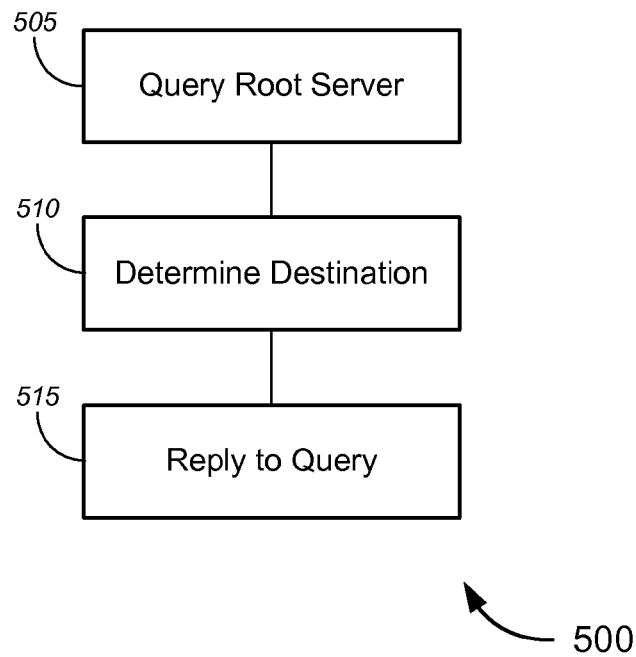

Different embodiments can feature a variety of modifications and enhancements. Merely by way of example, in some cases, the application server (and/or various components thereof) might be configured to determine routing information for messages (e.g., routes to different VoIP switches, voice mail platforms, and the like), VoIP switches might determine routing information for messages and/or call legs, etc. In some cases, these devices might be configured to determine such routes internally. In other cases, as noted above one or more of the system components might employ a route server to determine routing information for messages (e.g., SIP INVITEs) or call legs. Merely by way of example, the application server might use a route server to determine a destination for the SIP INVITEs it sends to the VoIP switch, and the VoIP switch might use a route server to determine routing for call legs and/or SIP INVITEs that it sends. FIG. 5 illustrates a method 500 of employing a route server for such purposes. In accordance with the method 500, a device (such as an application server, SIP server, VoIP switch, etc.) sends a query to the route server 505. In an aspect, the query can be a request for routing information to send a message, routing information for a call leg, and/or the like. At block 510, the route server determines a route to the destination (e.g., via lookup on a route table), and at block 515, the route server sends a response to the querying device. The response includes information to enable the querying device to determine a route to the recipient of the message, call leg, and/or the like.

Similarly, the application server (and/or the components thereof) can be configured differently. As noted above, the functionality of the application server can be divided among multiple devices. In one such configuration, an SCP is configured to receive or detect the TAT, and a SIP server (which can include the CV server) is configured to interact with the VoIP switch. In many cases, for example, the SCP is configured to communicate using Parlay messaging, and the SIP server is configured to communicate using IP communications (and particular, SIP messaging); thus, these two devices might not be configured communicate natively with one another, certain embodiments provide a technique to provide for communication between the SCP and the SIP server.

Figure 6:
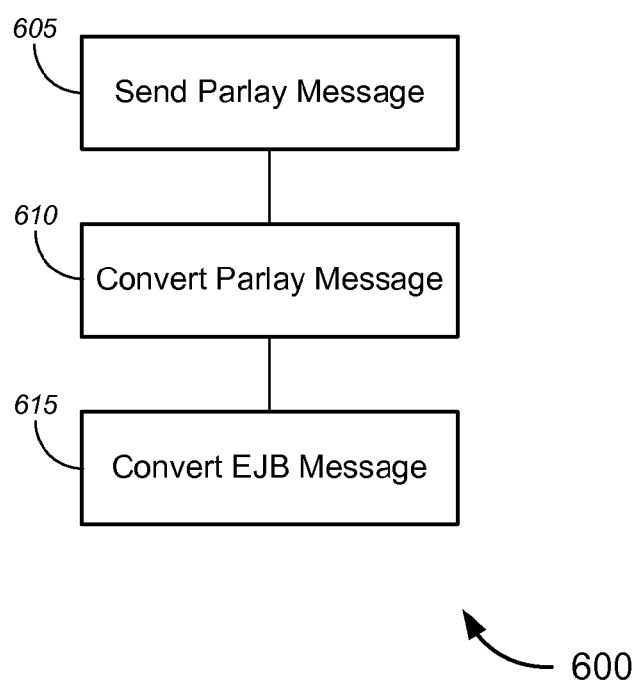

Any number of technologies can be used to employ an intermediate message format for converting between a Parlay message and a SIP INVITE. As but one example, FIG. 6 illustrates a method 600 for translating between the output from the SCP (a Parlay message) and an input message that the SIP server can interpret (a SIP INVITE). At block 605, the SCP (or other device) sends a standard Parlay message to invoke a SIP server. At block 610, the Parlay message is converted to an EJB message (e.g., by a Parlay-EJB adapter), or any other type of intermediate message. At block 615, the EJB message (or other intermediate message) is converted to a SIP INVITE (e.g., by an EJB-SIP adapter). In some cases, a Parlay-SIP adapter might perform the functions of both the Parlay-EJB adapter and the EJB-SIP adapter, while in others, a Parlay-SIP adapter might be configured to convert the Parlay message directly to a SIP INVITE without the intermediate EJB conversion.

In some embodiments, a call may be routed to a wireless number. For example, in some cases, the subscriber number called by the originating caller might be a wireless number. In other cases, the wireless number might receive a call from the VoIP switch as part of a sequential ring service. In such cases, the wireless network (or a component thereof, such as the MSC) might be provisioned with a specified telephone number associated with the VoIP switch to be used in the case of a no-answer condition on the wireless number, a busy condition on the wireless number, an out-of-coverage condition on the wireless number (which can occur if the wireless phone is out of network coverage or turned off), etc. This specified number, which might be a toll-free number (e.g., 8XX number) can be provisioned at the MSC (or other component of the wireless network) to replace the normal voice mail call forwarding number ("CFN") for that wireless line.

Figure 7:
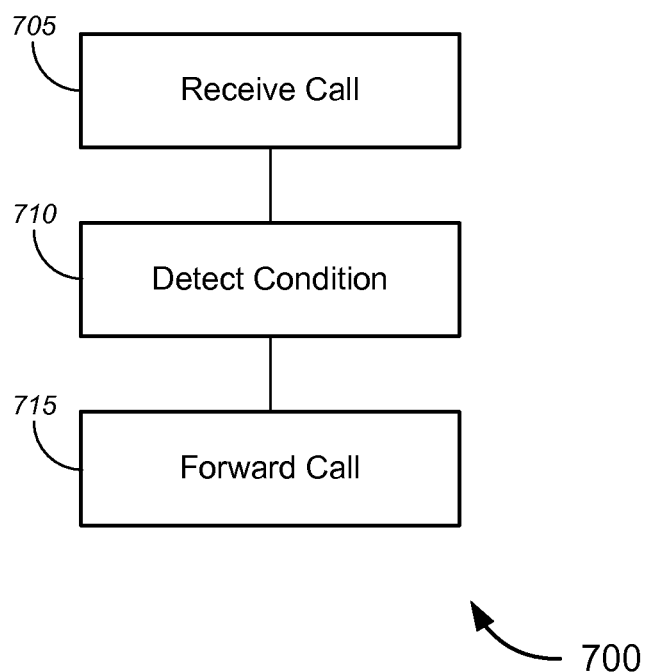

Using such a technique can prevent the interruption of the enhanced service processing by the standard wireless network voice mail, allowing the call path of the enhanced service to be completed (e.g., allowing for the call to the routed to the next number in a sequential ring group, allowing the call to be routed to a converged voice mailbox, as described below, etc.) Thus, FIG. 7 illustrates a method 700 of handling a call in a wireless network to support the enhanced services disclosed herein. At block 705, the wireless network (e.g., the MSC) receives a call directed to the subscriber's wireless number. At block 710, the MSC detects a busy, no-answer, or out-of-coverage condition on the wireless number. In response to detecting this condition, the MSC forwards the call to the specified number associated with the VoIP switch (block 715).

Figure 8:
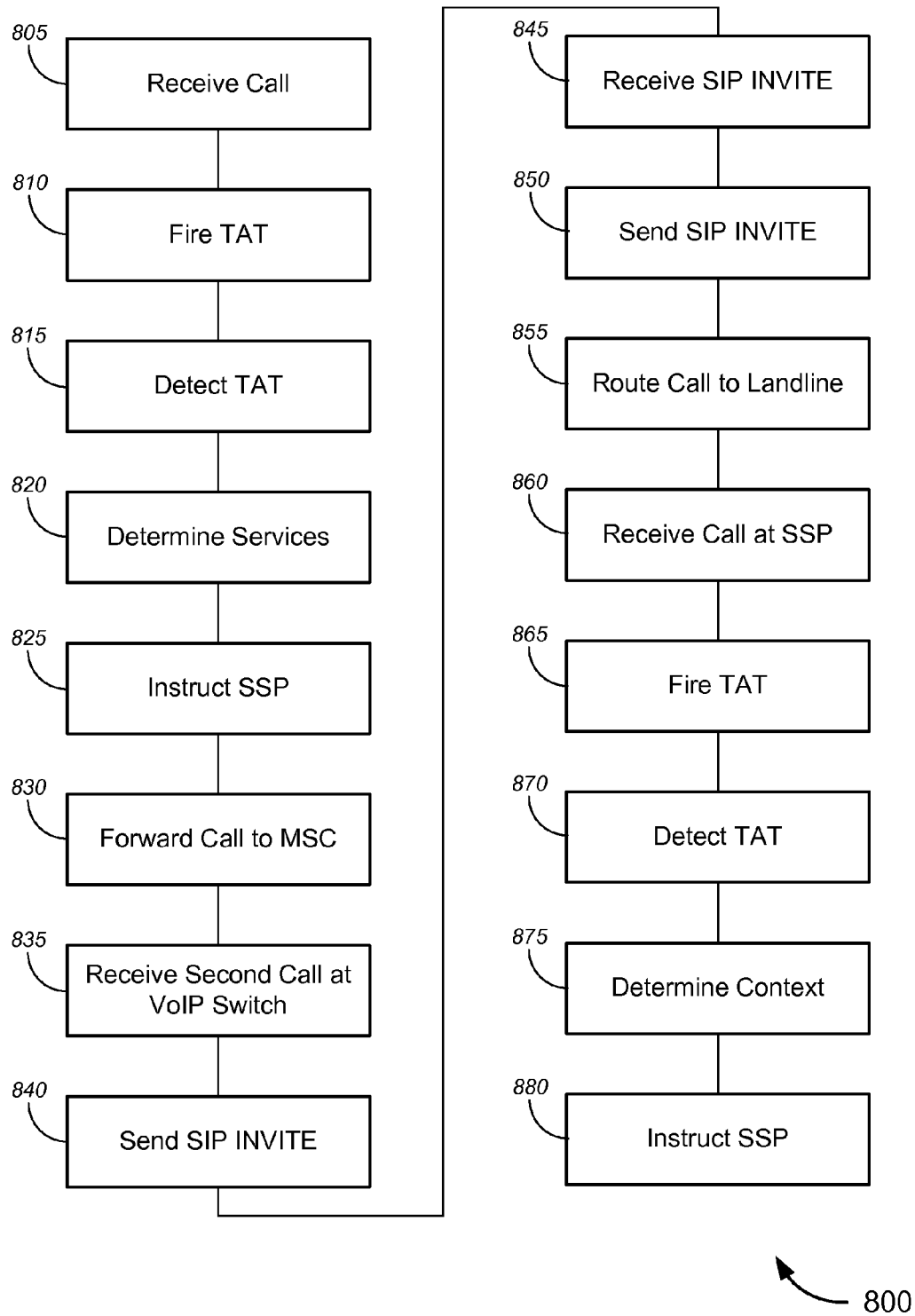

While the operations of the method 400 described above can be used to provide generalized converged voice services (such as simultaneous ring service), some scenarios can call for variations on that generalized process. For example, FIG. 8 illustrates a method 800 that can be employed to provide sequential ring services in accordance with various embodiments. (It should be noted that many of the operations of the method 800 are similar to corresponding operations of the method 400 above. In such cases, the foregoing description of these operations applies equally in the context of the method 800 for providing sequential ring services.) For purposes of illustrating specific features of one set of embodiments, in the scenario contemplated by the method 800, the subscriber has configured a wireless number to be the first number called in a sequential ring group and has configured a landline number to be the second number called in the sequential ring group, such that any call to one of the subscriber's numbers will first ring the wireless phone, and then, if unanswered, will ring the subscriber's landline phone. Of course, one skilled in the art will appreciate, based on the disclosure herein, that various embodiments can support different ordering of numbers in the sequential ring group).

At block 805, the SSP (or other telephony switch) receives an incoming call to one of a plurality of telephone numbers associated with a subscriber to the sequential ring services, and at block 810, the telephony switch fires a TAT in response to receiving the call. The application server/SCP receives/detects the TAT (block 815). In response to the TAT, the application server (or a component thereof) determines that the subscriber has configured sequential ring services (block 820), for example by querying an NPD. At block 825, the application server/SCP instructs the SSP to forward the call to the wireless number (i.e., to the MSC associated with the wireless number). The MSC then attempts to terminate the call to the wireless number. Assuming the call is not answered at the wireless number (e.g., the MSC detects a no-answer, busy, or out-of-coverage condition), the MSC forwards the call to the VoIP switch (block 830), e.g., using the process described with respect to FIG. 7.

The VoIP switch receives the call forwarded from the MSC (which is described herein, from the perspective of the system, as a second call) at block 835. In response to receiving the forwarded call, the VoIP switch sends a SIP INVITE to the application server (block 840) to seek instructions on how to handle the call. The application server receives the SIP INVITE (block 845), determines the context of the second call (i.e., that the second call is really the original incoming call that has been forwarded back to the VoIP switch from the MSC), and sends a SIP INVITE back to the VoIP switch (block 850) instructing the VoIP switch to send the call to the subscriber's landline number. Alternatively and/or additionally, Instead of sending another INVITE out to the VoIP switch, the application server could instead instruct the VoIP switch to redirect the incoming INVITE to the landline (e.g., using a SIP 302 response).

The VoIP switch then routes the call to the landline number (block 855). In this embodiment, the SSP is the serving switch for the landline number, so the SSP receives the routed call (block 860) and fires another TAT (block 865). The SCP/application server receives/detects the second TAT (block 870). In response to the TAT, the SCP/application server determines a context of the call (i.e., that the call has been forwarded from the VoIP switch specifically for the landline number). In this case, the call should not be re-routed to the VoIP switch or to the MSC (as the original incoming call was routed at blocks 825-830), since the call already went unanswered at the wireless number. Accordingly, the SCP/application server determines, based on this context, that the call should be completed to the landline number, and it instructs the SSP to terminate the call at the landline number (block 880). The SSP then terminates the call to the landline number in the conventional fashion.

Other scenarios can be supported in accordance with various embodiments. For example, in one embodiment, when a caller dials the landline number, the AIN TAT trigger on the EOS fires, contacting the SCP. The SCP sends a Parlay message, which the PSA converts to a SIP INVITE message, which is then sent to the SLIM. The SCIM performs NPD lookups to determine to which services the called party subscribes and, upon detection of converged voice service provisioning, sends a SIP INVITE message to the CV server. The CV server performs NPD lookups on the subscriber's telephone number to retrieve current service configuration information (such as on/off, simultaneous or sequential ringing, and the other numbers associated with the wireline and their individual on/off status). Based on the state of the service, the CV server sends a SIP reply back up through the call path, ultimately instructing the EOS to either ring the landline (if the service is off) or forward the call to either a single associated number (for sequential ringing) or forward the call to a Direct Inward Dial (DID) number provisioned on NGS (for simultaneous ringing).

As another example, when a call is forwarded from the landline to a single number and that number is busy or not answered, that number (as a result of provisioning activity) will forward the call to the VoIP switch via a specified number. The VoIP switch contacts the SCIM, which invokes the CV server again to determine the next step to take with the call which, depending on the service configuration, could be to ring another number, ring multiple numbers simultaneously, or send the call to voice mail. (In an alternative embodiment, an IMS interrogating call session control function ("I-CSCF") and/or an IMS serving call session control function ("S-CSCF") are positioned between the VoIP switch and the SCIM.) If the call is to be sent to another number, the subscriber has the option of configuring the system to play a brief "Please hold while we try to locate your party" message to the caller to keep the caller on-line during the extended ringback cycle (e.g., when the application server instructs the VoIP switch to forward the call to the SSP for termination to the landline). This feature can encourage the caller to stay on the line during the extended ringing that is going to result from first ringing the wireless and now ringing the landline. This is a novel approach to encouraging people to stay on the line for a sequential ringing service when they might otherwise hang up before the called party has a chance to answer on a secondary number. When so requested, the CV server engages the MS to play this message to the caller.

B. Converged Voice Mail Services

Another service that can be provided by the novel architecture of certain embodiments is a converged voice mail service, in which calls to a plurality of subscriber lines all can be routed to the same voice mailbox, and each of those subscriber lines can retrieve messages from that same voice mailbox. Some embodiments, therefore provide a unified voice mailbox to manage, with single greeting, message list, password, and other options to configure, instead of requiring management of multiple mailboxes on multiple (potentially dissimilar) messaging platforms.

In an aspect of some embodiments, the subscriber's telephone numbers can be landline, wireless, or VoIP, yet use the exact same voice mailbox. (In fact, although exemplary embodiments use a VoIP switch as part of the architecture for providing enhanced services, including converged voice mail, the subscriber's plurality of telephone numbers need not include a VoIP number at all.) In another aspect, calls to any of a subscriber's phone numbers will reach the same voice mailbox if the dialed number is busy or not answered. In some cases, message waiting notifications are transmitted to all numbers associated with the single voice mail account. In some embodiments, existing landline-based technologies are used to route calls and messages to/from the voice messaging platform, but other embodiments employ additional technologies to enable multiple wireless and/or VoIP numbers to use the same landline-based voice mailbox, including not only routing of callers to the same voice mailbox, but also routing of the subscriber for retrieval of messages from any endpoint and sending of message waiting indications to all endpoints.

Certain embodiments can employ the architecture described with respect to FIGS. 1-3 to provide converged voice mail services, and the exemplary techniques below are described, in some cases, with respect to that architecture. It should be noted as well that the techniques for providing converged voice mail services can be combined in many different aspects with the techniques for providing converged voice services (such as one-number service) described above.

Figure 9:
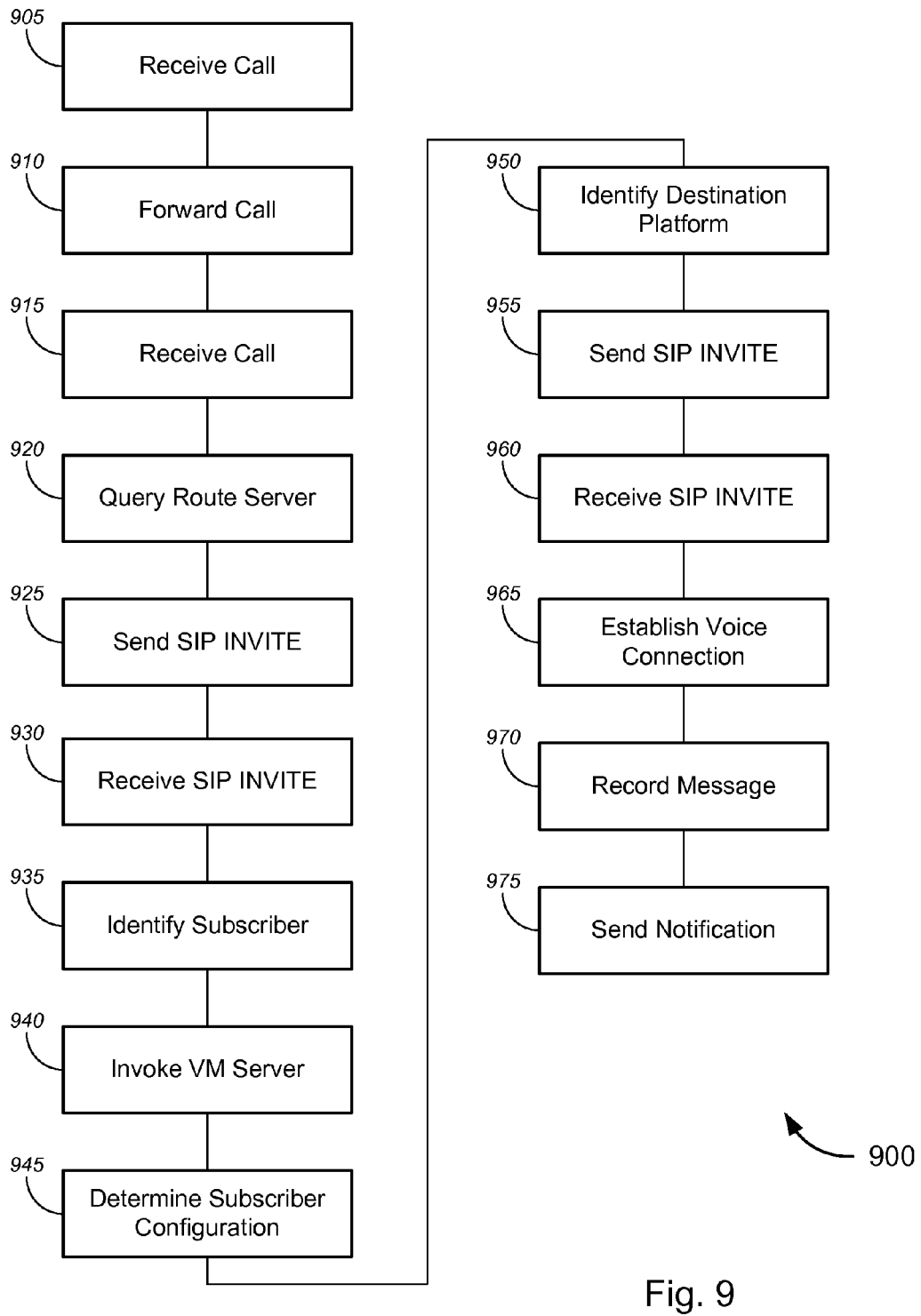
FIGS. 9 and 10 are process flow diagrams illustrating various methods for providing converged voice mail, in accordance with various embodiments.

FIG. 9 illustrates a method 900 of receiving a voice message at a converged voice mailbox in accordance with various embodiments. In accordance with the method 900, a telephony switch (e.g., an MSC or an SSP) receives an incoming call at block 905. In some cases, the incoming call is addressed to one of a plurality of numbers associated with a subscriber to converged voice mail services. Accordingly, at block 910, the telephony switch forwards and/or routes the incoming call to a specified number associated with a VoIP switch (block 910). In some cases (e.g., if the telephony switch is an MSC), the method 700 described above with respect to FIG. 7 can be used to perform these operations. (As noted above, such a telephony switch might be provisioned to forward the call to a specified number on the event of a no-answer, busy, or out-of-coverage condition). Alternatively and/or additionally, in other embodiments (e.g., if the telephony switch is an SSP), the procedures described above with respect to blocks 400-425 of FIG. 4 can be used to perform these operations.

At block 915, the VoIP switch receives the call (whether forwarded from an SSP/MSC/etc. or otherwise). As discussed above, when receiving an incoming call, the VoIP switch sends a SIP INVITE to the application server (or a functional component thereof, such as a SIP server) to obtain instructions on how to handle the call. In some cases, the VoIP switch will query a route server (block 920), e.g., using the procedures of the method 500 described with respect to FIG. 5, to determine a route for sending the SIP INVITE. At block 925, the VoIP server sends a SIP INVITE to the appropriate application server (which, as noted above, can be incorporated within an application server, which might comprise the VM controller as well), e.g., using routing information obtained from a route server.

The SIP server receives the SIP INVITE (block 930) and, upon receiving the INVITE, identifies the subscriber as a subscriber to a converged voice mail service (block 935). For example, the SIP server might query an NPD to determine that the subscriber has converged voice mail services provisioned. Based on the identification of the subscriber as one that has subscribed to converged voice mail services, the SIP server invokes the VM controller (block 940). (It should be noted, once again, that the VM controller can be a servlet that executes on the SIP server and/or the application server, and/or that the functionality of the VM controller can be incorporated into one or more of those devices).

At block 945, the VM controller determines subscriber configuration information, e.g., by querying an NPD. In particular, for example, the VM controller might identify a destination messaging platform for the subscriber (block 950). As noted above, in some cases, the system will include a plurality of messaging platforms, each serving a different set of subscribers. Accordingly, the VM controller might need to identify which of these platforms is the appropriate platform for the subscriber to whom the call is directed. In other cases, the VM controller might identify the landline messaging platform (as opposed to a wireless messaging platform or a VoIP messaging platform) as the destination platform for a wireless number or a VoIP number that is subscribed to the converged voice mail service. Information identifying the destination platform might be stored in the NPD, such that the VM controller can query the NPD to determine which messaging platform is used to store messages for that particular subscriber. In other cases, such information might be stored at the VM controller itself.

The VM controller then sends a SIP INVITE to the identified messaging platform (block 955) (either directly or through the PSTN, depending on whether the identified messaging platform is local to the VM controller). Upon receiving the SIP INVITE (block 960), the messaging platform establishes a voice connection with the calling party (block 965). For example, the SIP INVITE might instruct the messaging platform to connect to the VoIP switch, which then connects the incoming call with the messaging platform. Upon establishing the voice connection, the messaging platform records a voice mail message in a voice mailbox associated with the voice mail subscriber (block 970), in the conventional fashion.

It will be noted by the reader that, in several different contexts, the application server (or a component therefore, such as the SIP server, VM controller, or CV server) will receive a SIP INVITE and, in response, send one or more SIP INVITES of its own. This procedure can be accomplished in different ways. For example, in some cases, the application server (or appropriate component) can serve as a SIP proxy and simply reroute the received SIP INVITE to the appropriate destination(s). In other cases, the application server (or appropriate component) might be configured to act as a back-to-back user agent ("B2BA") known in the art, and in such configuration might receive the SIP INVITE and generate one or more new SIP INVITEs to send to the appropriate destination(s). As used in such contexts herein, the term "send a SIP INVITE" can encompass both the SIP proxy behavior and the B2BA behavior.

The system then sends a notification to the subscriber (block 975) to inform the subscriber of the new voice message. Merely by way of example, the system (and/or a component thereof, such as the VM controller or messaging platform), which has identified the subscriber numbers provisioned for the converged voice mail service, can send message waiting notifications to each of those numbers (whether wireless, wireline, or VoIP), and the native platforms for each of those numbers can handle the message waiting notification in the conventional fashion.

Figure 10:
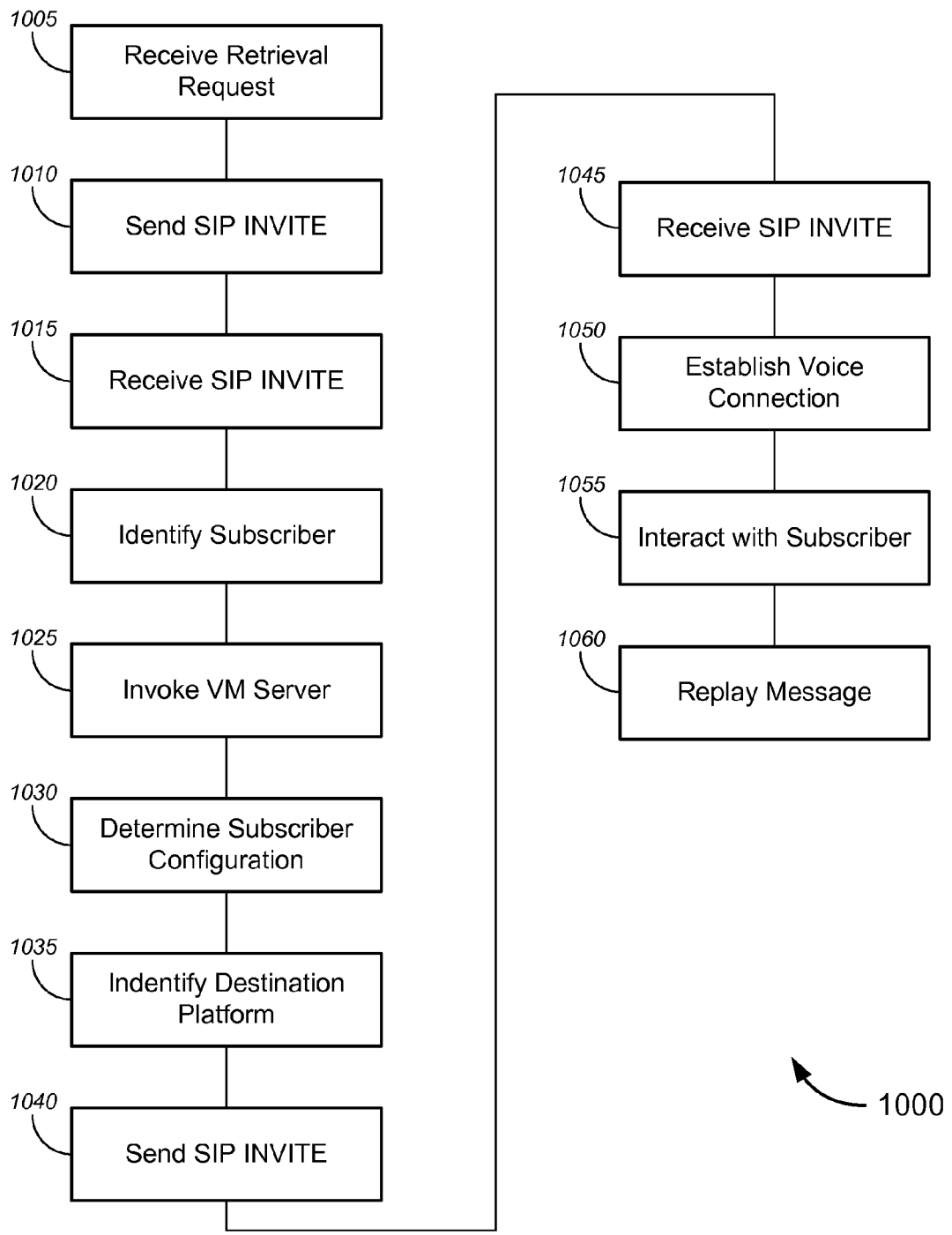

When the subscriber wishes to retrieve a message, the system employs a similar process, as detailed by FIG. 10, which illustrates a method 1000. In accordance with the method 1000, the VoIP server receives a message retrieval request at block 1005. (In some cases, this request might be routed from a telephony switch, such as an SSP or MSC, in which case the procedures described above can be used to route the request, which might take the form of an incoming call.) At blocks 1010-1045, the system performs operations similar to those described above with respect to blocks 925-960 of FIG. 9 (and, although not illustrated on FIG. 10, the system might also query a route server, as described with respect to block 920 above).

At block 1050, the messaging platform establishes a voice connection with the subscriber (similar to how the platform establishes a voice connection with the caller at block 965 above). The messaging platform then interacts with the subscriber (block 1055). For example, as is known in the art, the messaging platform might provide a subscriber interface using an interactive voice response ("IVR") unit and/or a set of pre-recorded instructions and corresponding DTMF menu selections (e.g., "Press 1 to listen to new messages.").

In response to the interaction with the subscriber, the messaging platform replays the message for the subscriber (block 1060) over the voice connection between the messaging platform and the subscriber. In some cases, after the message has been replayed for the subscriber (and depending on the subscriber's selections, such as to delete the message), the VM controller might send a message waiting reset notification to each of the subscriber's numbers, in the manner described above.

In light of the general process for providing converged voice services described above, one skilled in the art will appreciate that numerous variations are possible, and that a number of specific scenarios can be supported. Merely by way of example, wireless numbers associated with the service can be configured with call forwarding busy/no answer to be routed to a specified telephone number associated with the VoIP switch, as noted above. When a call to a wireless number encounters a busy or no-answer condition, the specified number routes to the VoIP switch, from which a SIP INVITE is sent to the application server (or, in particular cases, to the SCIM, which as noted above, can be considered part of the application server in some embodiments). The application server/SCIM performs NPD lookups to determine to which services the called party subscribes. The application server/SCIM, upon detection of converged voice mail provisioning, sends a SIP INVITE message to the VM controller application. (In an alternative embodiment, an IMS I-CSCF and/or an IMS S-CSCF are positioned between the VoIP switch and the SCIM.)

When the VM controller is invoked, additional NPD lookups are performed to retrieve details about the subscriber VM configuration. The VM controller then routes the call to the appropriate messaging platform via SIP INVITE. The messaging platform contains configuration information showing that the landline voicemail box is shared with the wireless number, so that when a call arrives for the wireless number, the platform places the calling party into the wireline-based voice mailbox, the platform (or the VM controller) sends message waiting notifications to both the landline and the wireless number simultaneously. When the message is retrieved, the platform (or the VM controller) sends another message waiting (reset) notification to both lines simultaneously.

In another embodiment, when a wireless subscriber calls to retrieve voice mails, he/she dials the message retrieval abbreviated dial code (typically *86). In the wireless switch, this number is provisioned to route to the same specified number as Call Forwarding Busy/No Answer. When the call arrives at the application server/SCIM and forwarded on to VM controller, the call context is evaluated and it is detected that the calling party is the subscriber calling to retrieve his or her voice messages. The VM controller routes the call to the messaging platform with a SIP INVITE formatted to make it appear as if the wireless number dialed the landline's message retrieval number directly, which causes the messaging platform to place the caller/subscriber into message retrieval mode.

As another example of specific functionality provided by various embodiments, VoIP numbers associated with the service can be configured with Call Forwarding Busy/No Answer to be routed a virtual number assigned to the application server/SCIM, from which processing is essentially the same as that described above with respect to wireless number.

In an alternative embodiment, the messaging platform need have no knowledge of the multiple numbers that are associated with the single landline number. Instead, the messaging platform is configured as normal for a single-line landline account, and the VM controller service constructs all SIP messages to the platform to appear as if the call is arriving on behalf of the landline number.

In another alternative embodiment of this invention, a voice mailbox could be set up on any telephone number rather than just the wireline telephone number, and that telephone number could be designated as the primary TN for the voice mail account in the messaging platform and NPD, such that all calls to secondary TNs associated with the primary TN will be routed to the same voice mailbox as the primary TN.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A system for providing converged voice services, the system comprising:
   a service switching point (SSP) configured to:
      receive, via a public switched telephone network (PSTN), a call from a calling party to a first telephone number of a plurality of telephone numbers associated with a converged voice services subscriber, the plurality of telephone numbers further comprising a second telephone number;
      fire a termination attempt trigger (TAT) in response to receiving the call;
   an application server configured to:
      detect the TAT; and
      determine, in response to the TAT, that the subscriber has configured simultaneous ring services;
      send a message to the SSP instructing the SSP to forward the call to a voice over Internet Protocol (VoIP) switch;
   the VoIP switch configured to:
      receive the forwarded call from the SSP;
      send a first SIP INVITE, in response to receiving the forwarded call;
   wherein:
      the application server is further configured to:
         receive the first SIP INVITE; and
         send, in response to receiving the first SIP INVITE, a plurality of additional SIP INVITEs, the plurality of additional SIP INVITEs comprising an additional SIP INVITE corresponding to each of the plurality of telephone numbers and including a first additional SIP INVITE corresponding to the first telephone number and a second additional SIP INVITE corresponding to the second telephone number; and
      the VOIP switch is further configured to:
         receive each of the plurality of additional SIP INVITEs;
         create a plurality of call legs via the PSTN, the plurality of call legs comprising a call leg corresponding to each of the additional SIP INVITEs and including a first call leg to the first telephone number and a second call leg to the second telephone number; and
         connect the forwarded call with at least one of the call legs.

2. The system of claim 1, wherein the application server comprises a service control point (SCP) and a converged voice server, and wherein:
   the SCP is configured to:
      receive the TAT; and
      invoke the converged voice server in response to the TAT; and
   the converged voice server is configured to:
      receive the first SIP INVITE; and
      send the plurality of additional SIP INVITEs.

3. The system of claim 2, wherein invoking the converged voice server comprises sending a Parlay message from the SCP, and wherein the application server further comprises a Parlay-SIP adapter configured to:
   receive the Parlay message;
   convert the Parlay message into a SIP message that can be interpreted by the converged voice server.

4. The system of claim 3, wherein converting the Parlay message into a SIP message that can be interpreted by the converged voice server comprises:
   converting the Parlay message into an Enterprise Java Beans (EJB) message; and
   converting the EJB message into the SIP message that can be interpreted by the converged voice server.

5. The system of claim 2, wherein the converged voice server is a servlet running on the SCP.

6. The system of claim 1, wherein the application server is configured to query a network profile database to determine that the subscriber has subscribed to converged voice services.

7. The system of claim 6, wherein the network profile database is a home subscriber server (HSS).

8. The system of claim 1, further comprising a route server, wherein the application server is further configured to obtain, from the route server, call routing information for at least one of the call legs.

9. The system of claim 1, further comprising a route server, wherein the VoIP switch is further configured to obtain, from the route server, call routing information for at least one of the SIP INVITEs.

10. The system of claim 1, wherein the first telephone number is a landline number, and wherein the first call leg is routed to the SSP, the SSP being further configured to fire a second TAT in response to receiving the first call leg, and the application server being further configured to:
    receive the second TAT;
    determine a context of the first call leg; and
    instruct the SSP to terminate the first call leg to the landline number, based on the context of the first call leg.

11. The system of claim 1, wherein the application server is further configured to:
    detect that one of the call legs has been answered; and
    instruct the VoIP switch to disconnect each of the plurality of call legs other than the call leg that has been answered.

12. The system of claim 11, wherein detecting that one of the call legs has been answered comprises determining that the one of the call legs has been answered by a human, and wherein the application server is configured to wait to instruct the VoIP switch to disconnect any of the plurality of call legs until it has determined that one of the call legs has been answered by a human.

13. The system of claim 12, wherein determining that the one of the call legs has been answered by a human comprises playing a predetermined tone to cause a voice mail system to disconnect.

14. The system of claim 12, wherein determining that the one of the call legs has been answered by a human comprises:
    playing a message requesting the listener to press a particular key on a telephone handset; and
    receiving a dual tone multi-frequency (DTMF) tone corresponding to the particular key.

15. The system of claim 1, wherein the first telephone number is a wireless number, and wherein the system further comprises a mobile switching center (MSC) associated with the wireless number, the MSC being provisioned with a specified telephone number associated with the VoIP switch, the MSC being configured to:

receive the call directed to the wireless number;
detect a busy, no answer, or out of coverage condition on the wireless number; and
forward the call to the specified telephone number associated with the VoIP switch in response to detecting the busy, no answer, or out of coverage condition on the wireless number.

16. A method of providing converged voice services, the method comprising:
receiving, at a service switching point (SSP), a call from a calling party to a first telephone number of a plurality of telephone numbers associated with a converged voice services subscriber, the plurality of telephone numbers further comprising a second telephone number;
firing, at the SSP, a termination attempt trigger (TAT) in response to receiving the call;
detecting the TAT;
instructing the SSP to forward the call to a VoIP switch, in response to detecting the TAT;
receiving the forwarded call at the VoIP switch;
sending a first SIP INVITE from the VoIP switch;
receiving the first SIP INVITE;
sending a plurality of additional SIP INVITEs in response to receiving the first SIP INVITE, the plurality of additional SIP INVITEs comprising an additional SIP INVITE corresponding to each of the plurality of telephone numbers and including a first additional SIP INVITE corresponding to the first telephone number and a second additional SIP INVITE corresponding to the second telephone number;
receiving each of the plurality of SIP INVITEs at the VoIP switch;
creating, with the VoIP switch, a plurality of call legs via the PSTN, the plurality of call legs comprising a call leg corresponding to each of the additional SIP INVITEs and including a first call leg to the first telephone number and a second call leg to the second telephone number; and
connecting the forwarded call with at least one of the call legs.

17. The method of claim 16, further comprising:
determining, with the route server, a destination for the first SIP INVITE; and
determining, with the route server, a VoIP switch that should receive each of the plurality of additional SIP invites.

18. The method of claim 16, wherein one of the plurality of telephone numbers is a wireless number associated with a mobile switching center (MSC), the method further comprising:
provisioning the MSC with a private number associated with the VoIP switch, the private number to be used to forward calls directed to the wireless number in the event of a busy, no answer, or out-of-coverage condition on the wireless number.

19. A system for providing converged voice services, the system comprising:
a service switching point (SSP) configured to:
receive, via a public switched telephone network (PSTN), a first call from a calling party to a first telephone number of a plurality of telephone numbers associated with a converged voice services subscriber, the plurality of telephone numbers further comprising a second telephone number, wherein at least one of the plurality of telephone numbers is a wireless number and at least one of the plurality of telephone numbers is a wireline number;
fire a first termination attempt trigger (TAT) in response to receiving the first call;
an application server configured to:
determine, in response to the first TAT, that the subscriber has configured sequential ring services;
instruct the SSP to forward the call to the wireless number; and
a VoIP switch configured to:
receive a second call, forwarded from a wireless system to a specified telephone number associated with the VoIP switch; and
send, in response to receiving the second call, a first SIP INVITE;
wherein the application server is further configured to:
receive the first SIP INVITE; and
send a second SIP INVITE in response to receiving the first SIP INVITE;
wherein the VoIP switch is further configured to:
receive the second SIP INVITE;
route the second call via the PSTN to the landline number, in response to the second SIP INVITE;
wherein the SSP is further configured to:
receive the second call; and
fire a second TAT in response to receiving the call; and
wherein the application server is further configured to:
determine, in response to the second TAT, a context of the second call, the context indicating that the second call is the first call forwarded from a mobile switching center (MSC) associated with the wireless number; and
instruct the SSP to terminate the second call at the landline number, in response to determining the context of the second call.

20. The system of claim 19, further comprising:
a mobile switching center ("MSC") configured to:
receive the call forwarded from the SSP;
detect a busy, no answer, or out of coverage condition on the wireless number; and
forward the call to the specified number associated with the VoIP switch.

21. The system of claim 19, wherein the Application server is further configured to query a network profile database to determine that the subscriber has configured sequential ring services.

22. A method of providing converged voice services, the method comprising:
receiving, at a service switching point (SSP), a first call from a calling party to a first telephone number of a plurality of telephone numbers associated with a converged voice services subscriber, the plurality of telephone numbers further comprising a second telephone number, wherein at least one of the plurality of telephone numbers is a wireless number and at least one of the plurality of telephone numbers is a wireline number;
firing, at the SSP, a first termination attempt trigger (TAT) in response to receiving the first call;
determining, in response to the first TAT, that the subscriber has configured sequential ring services;
instructing the SSP to forward the call to the wireless number;
receiving, at a VoIP switch, a second call forwarded from a wireless system to a specified number associated with the VoIP switch;
sending from the VoIP switch, a first SIP INVITE, in response to receiving the second call;
receiving the first SIP INVITE;

sending a second SIP invite to the VoIP switch, in response to receiving the first SIP INVITE;

routing the second call, via the PSTN, to the landline number, in response to receiving the second SIP INVITE;

receiving the second call at the SSP;

firing a second TAT in response to receiving the second call;

determining, in response to the second TAT, a context of the second call, the context indicating that the second call is forwarded from a mobile switching center (MSC) associated with the wireless number; and instructing the SSP to terminate the second call to the landline number, in response to determining the context of the second call.

* * * * *